United States Patent [19]

Cloutier

[11] Patent Number: 5,006,878
[45] Date of Patent: Apr. 9, 1991

[54] MAGNETIC RECORDING ON FILM OF BEYOND CAMERA EXPOSURE VALUE RANGE INDICATION

[75] Inventor: Robert P. Cloutier, Spencerport, N.Y.

[73] Assignee: Eastman Kodak Company, Rochester, N.Y.

[21] Appl. No.: 405,815

[22] Filed: Sep. 11, 1989

[51] Int. Cl.$^5$ ............................................. G03B 7/00
[52] U.S. Cl. ................................... 354/412; 354/21; 354/105
[58] Field of Search ................. 354/21, 105, 106, 109, 354/412

[56] References Cited

U.S. PATENT DOCUMENTS

| | | |
|---|---|---|
| 3,736,849 | 6/1973 | Thompson . |
| 3,843,956 | 10/1974 | Kauneckas . |
| 4,340,286 | 7/1982 | Carr . |
| 4,443,077 | 4/1984 | Tanikawa . |
| 4,500,183 | 2/1985 | Tanikawa . |
| 4,574,319 | 3/1986 | Konishi . |
| 4,613,911 | 9/1986 | Ohta . |
| 4,659,198 | 4/1987 | Beauvilia . |
| 4,811,042 | 3/1989 | Cloutier et al. ............ 354/106 |
| 4,860,037 | 8/1989 | Harvey ....................... 354/105 |
| 4,864,332 | 9/1989 | Harvey ....................... 354/21 |

FOREIGN PATENT DOCUMENTS 59-162549  9/1984  Japan .
2158955A  3/1984  United Kingdom .

OTHER PUBLICATIONS

Kodak Publication, H-1-9000, Eastman Kodak Co., 1983.
Kodak Publication, V3-517, Eastman Kodak Co., 1984.

Primary Examiner—Russell E. Adams
Attorney, Agent, or Firm—Francis H. Boos, Jr.

[57] ABSTRACT

The camera of the invention includes a magnetic recording head adjacent the film and a processor which senses the lens focal length, the aperture size, the shutter speed and the film ISO number or film speed, and makes the following determinations: First, it determines from the scene brightness and film speed whether the ideal combination of shutter speed and aperture size, in terms of a required exposure value, falls within the range of maximum and minimum shutter exposure times and aperture sizes of which the camera is capable of providing, expressed in terms of a minimum camera exposure value and a maximum camera exposure value. If the ideal exposure value for that scene falls outside the range of camera exposure values, then the processor causes a magnetic recording head to magnetically record in or adjacent the current film frame a coded indication symbolic of the fact that the required exposure value was beyond the camera exposure value range.

7 Claims, 4 Drawing Sheets

MAGNETIC RECORDING ON FILM OF BEYOND CAMERA EXPOSURE VALUE RANGE INDICATION

TECHNICAL FIELD

The invention is related to magnetic recording of scene-related parameters on film.

BACKGROUND OF THE INVENTION

The ideal amount of light for exposing a frame of film is determined by the speed, or ISO number, of the film. The camera (or photographer) determines from the ISO number of the film and from the brightness of the scene about to be photographed how much of the scene illumination to admit through the camera shutter to the film to create the nominal exposure value corresponding to the film ISO number. Either the aperture size or the shutter exposure time (or both) must be adjusted accordingly. The amount of light is increased by increasing either the exposure time or the aperture size (or both) and is decreased by doing the opposite.

If the camera (or photographer) commits an error in determining the correct shutter exposure time and aperture size used to expose the film frame, the negative image on the color negative film is either slightly washed out (in the case of underexposure) or has insufficient contrast between different objects in the image (in the case of overexposure). The effect is sometimes unavoidable, particularly in cases of high speed photography wherein the shutter exposure time must be extremely short. If the photofinisher is aware of such an error, he can correct such problems by changing the amount of light used to expose the film image onto print paper, in accordance with well-known techniques in the art. The problem is that, absent a skilled photofinishing operator or a sophisticated film image scanner such as those used in the Eastman Kodak Company CLAS 35 film printer, the photofinisher will not necessarily know that a particular film frame has been over- or underexposed.

A more severe problem is that the brightness of the scene may have been so great or so little that the required shutter exposure time and/or aperture size is beyond the range of the camera to provide the correct exposure value on the film. In such a case, the photofinisher does not know if this has happened until after the film has been developed and either an extremely dark or an extremely light image is observed on the film. It would be better if the photofinisher were informed prior to inspection of the film images that a particular frame was beyond the camera's exposure value range.

In the prior art it has been at least suggested that various scene parameters be recorded on film. Specifically, exposure conditions have been suggested as being recorded optically on the film. The disadvantage here is that such information is not available until after the film is developed. Moreover, the information may not be supplemented easily thereafter, since it must be carefully optically recorded on the film using special exposure devices such as those found in some of the higher quality automatic cameras.

While it has been suggested to record various scene parameters such as shutter speed and aperture size adjacent each frame on the film, it has not been suggested how to make such information meaningful to a photofinisher, since such information only has meaning if one knows the brightness of the scene and the capabilities of the camera.

Accordingly, it is an object of the invention to provide meaningful information on film which can be read and supplemented after the film has been taken out of the camera and prior to its being developed. Moreover, it is an object of the invention to provide such information in a manner that automatically correlates information pertaining to a particular film frame with that film frame unambiguously.

SUMMARY OF THE INVENTION

The invention uses film having a virtually transparent magnetic layer in which information pertaining to a particular film frame may be recorded on the film adjacent that frame. The camera of the invention includes a magnetic recording head adjacent the film and a processor which senses the lens focal length, the aperture size, the shutter speed and the film ISO number or film speed, and makes the following determinations: First, it determines from the scene brightness and film speed whether the ideal combination of shutter speed and aperture size, in terms of a required exposure value, falls within the range of maximum and minimum shutter exposure times and aperture sizes of which the camera is capable of providing, expressed in terms of a minimum camera exposure value and a maximum camera exposure value. If the ideal exposure value for that scene falls outside the range of camera exposure values, then the processor causes a magnetic recording head to magnetically record in or adjacent the current film frame a coded indication symbolic of the fact that the required exposure value was beyond the camera exposure value range. Preferably, this indication is recorded in a magnetic track extending parallel with the length of the film, the track being adjacent and in registration with the particular film frame of interest.

In one embodiment of the invention, if the processor determines that the ideal exposure value for the particular scene brightness does fall within the exposure value range of the camera, then the processor senses the aperture size and shutter exposure time actually employed by the camera in exposing the current film frame to compute an actual exposure value. It then determines whether this actual exposure value deviates significantly from the ideal exposure value and if so by how much. The deviation thus computed, if any, is also recorded in the same or an adjacent magnetic track in registration with the same film frame. The coded data representing such information is temporarily stored during exposure and then is magnetically recorded on the film by the camera's magnetic head as the film is wound to the next film frame following the exposure.

As a result, a plurality of magnetic tracks parallel with the length of the film dedicated respectively to the plurality of film frames is recorded in the camera. The lengthwise registration of the magnetic tracks with each frame correlates the information therein unambiguously to the film frame.

The photofinishing apparatus of the invention includes an exposure source for exposing each frame of the film onto photosensitive print paper. It further includes a magnetic playback head and playback circuits connected to a processor controlling the print exposure source as well as a film advance motor and print paper advance motor controlling the position of both the film and the print paper for the printing of successive frames. The photofinisher may search one of the magnetic film tracks in a predetermined location thereof to see whether a frame about to be printed was exposed to a scene whose brightness value was beyond the exposure value range of the camera or in which the camera made an error in determining the exposure value actually used.

DESCRIPTION OF THE DRAWINGS

The invention is best understood by reference to the accompanying drawings, of which.

DETAILED DESCRIPTION

Figure 1:
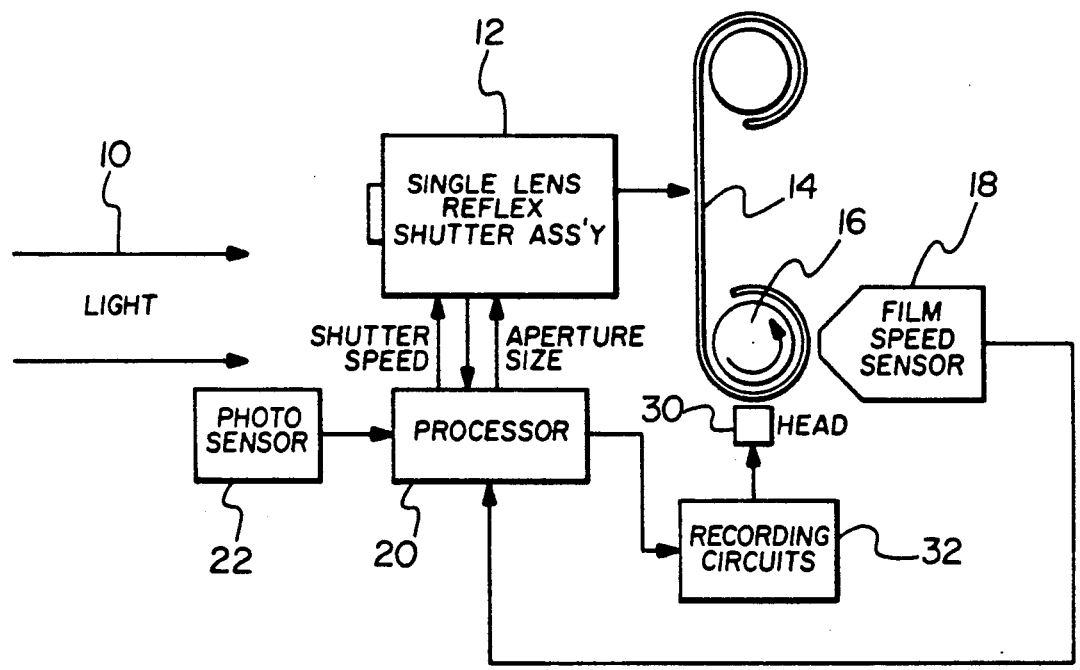
FIG. 1 is a simplified schematic block diagram illustrating a camera embodying an aspect of the invention.

Referring to FIG. 1, light 10 reflected from a scene to be photographed enters a lens shutter assembly 12 of the type well-known in the art. The shutter assembly 12 regulates the amount of the light 10 which reaches a strip of film 14 wrapped around a take-up reel 16. For this purpose, the shutter assembly admits light through an aperture characterized by a certain size, the aperture being open for a particular exposure time, the exposure time and aperture size determining the exposure value or amount of light reaching the film 14. The take-up reel 16 then rotates to bring the next frame of the film 14 into registration with the shutter assembly 12 in preparation for the next exposure. A film speed sensor 18, using well-known techniques such as DX coding on the film cartridge, senses the film speed or ISO number of the roll of film 14 and transmits this information to a processor 20. The processor 20 also receives a signal from a photosensor 22 representing the scene brightness value of the light 10. The processor 20 determines the exposure time and aperture size for exposing the next film frame from the scene brightness value received from the photosensor 22 and the film speed or ISO number received from the film speed sensor 18, using techniques well-known in the art. The processor 20 then transmits the exposure time and aperture size thus determined as servo commands to the SLR shutter assembly.

In the invention, the film 14 includes, as one of its layers, a virtually transparent magnetic material in which data may be magnetically recorded. To take advantage of this feature, the camera of FIG. 1 further includes a magnetic recording head 30 controlled by recording circuits 32. The processor 20 transmits data to the recording circuits 32 for recording on the film 14 through the head 30. In accordance with the invention, the processor 20 includes means for generating information upon which a photofinisher may rely in determining how to proceed in the development or printing of a particular one of the frames exposed on the film 14.

Figure 2:
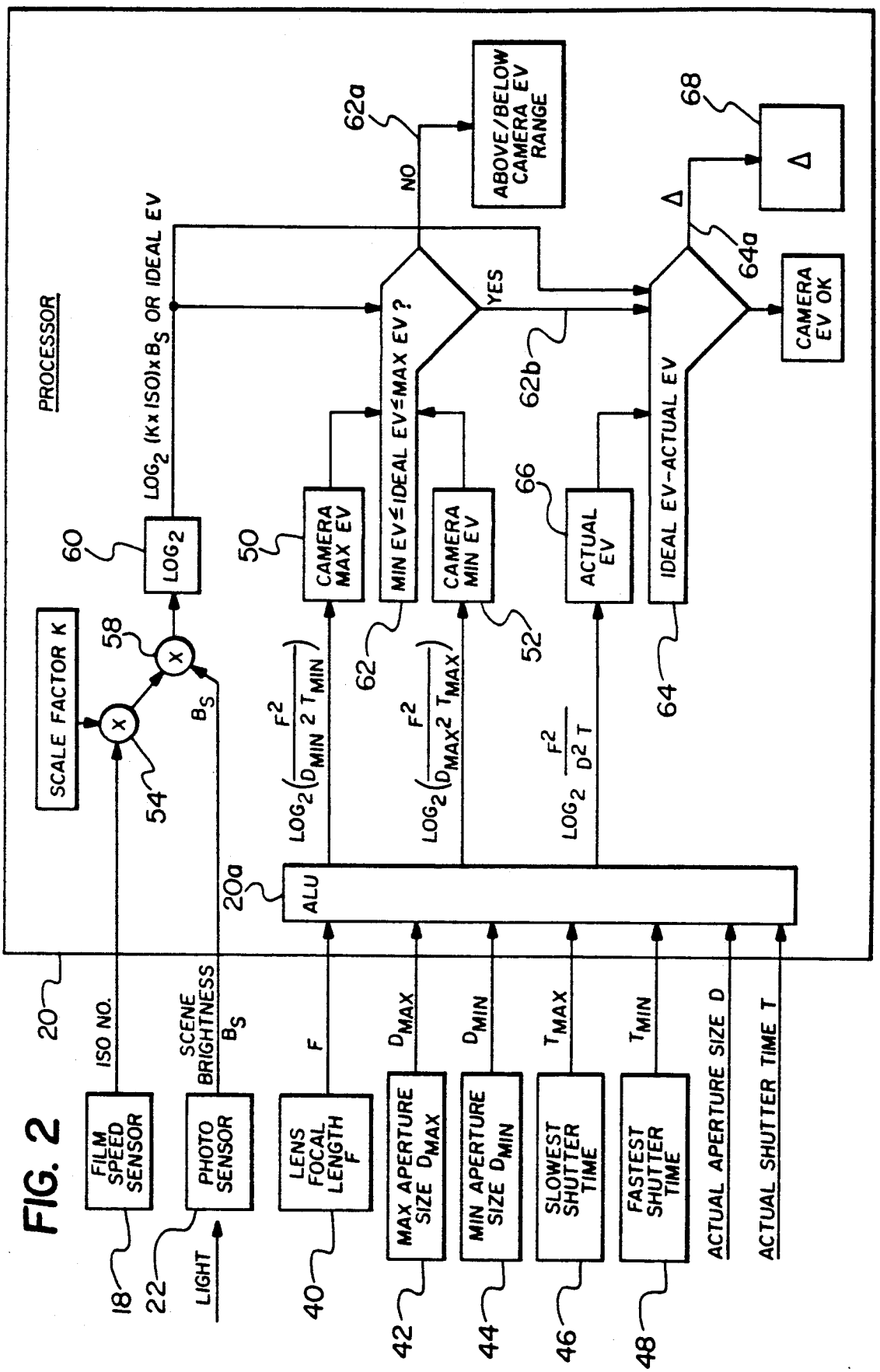
FIG. 2 is a functional block diagram illustrating a processor in the camera of FIG. 1.

Referring to FIG. 2, the processor 20 is furnished with information characterizing the shutter assembly 12, including the lens focal length F, the maximum aperture size $D_{max}$ of which the shutter assembly 12 is capable, the minimum aperture size $D_{min}$ of which the shutter assembly 12 is capable, the slowest possible shutter exposure time $T_{max}$ of which the shutter assembly 12 is capable, and the fastest shutter exposure time $T_{min}$ of which the shutter assembly 12 is capable. The information received may be in the form of respective look-up tables 40, 42, 44, 46, 48 which furnish the appropriate values depending upon which type of shutter assembly 12 is attached to the camera of FIG. 1. Furthermore, the processor 20 receives signals representing the actual aperture size D employed by the shutter assembly 12 in exposing a current frame of the film 14, as well as the actual shutter time T used to expose that frame. In addition, as described above in connection with FIG. 1, the processor 20 receives the film ISO number from the film speed sensor 18 and the scene brightness value from the photosensor 20.

In the following discussion, the actual exposure value (sometimes abbreviated EV) is defined as the base two logarithm of the square of the lens objective focal length divided by the product of the exposure time and the square of the aperture size. The ideal exposure value is defined as the base two logarithm of the product of the film ISO number, a scale factor and the scene brightness. The scale factor depends upon the units in which the scene brightness is measured. This latter definition defines the ideal exposure value or amount of light which the film should receive for a nominal exposure for ideal contrast and image quality. The purpose of the processor 20 or any other similar processor in an automatic SLR (single lens reflex) camera such as that illustrated in FIG. 1 is to reach an optimum correlation between the actual exposure value determined by the shutter speed and aperture size selected by the camera and the ideal exposure value computed from the scene brightness and the film speed or ISO number.

In FIG. 2, the processor 20, and specifically an arithmetic logic unit (ALU) 20a thereof computes the maximum exposure value of which the camera of FIG. 1 is capable and stores it in a memory 50. As indicated in FIG. 2, the value stored in the memory 50 is the base two logarithm of the square of the lens focal length divided by the product of the minimum exposure time and the square of the minimum aperture size of which the camera is capable. At the same time, the arithmetic logic unit 20a computes the minimum exposure value which the camera of FIG. 1 is capable and stores it in a memory 52. The value stored in the memory 52 is the base two logarithm of the square of the lens focal length divided by the product of the maximum exposure time and the square of the maximum aperture size of which the camera is capable.

Prior to each exposure, the processor 20 computes the ideal exposure value from the scene brightness value furnished by the photosensor 22 and the film speed furnished by the film speed sensor 18. As indicated in the top of FIG. 2, the ISO number from the film speed sensor 18 is multiplied in a multiplier 54 by a scale factor K. (In accordance with well-known techniques, the scale factor K depends upon the units in which the film speed is measured by the film speed sensor 18 and the units in which the scene brightness value is measured by the photosensor 20.) The scene brightness value furnished by the photosensor 20 is multiplied in a multiplier 58 by the product previously computed by the multiplier 54. Arithmetic logic unit 60 then computes the base two logarithm of the product produced by the multiplier 58, the result being the ideal exposure value with which the current film frame should be exposed to the scene currently viewed through the shutter assembly 12. Next, a comparator 62 compares the ideal exposure value thus computed with the maximum and minimum camera exposure values stored in the memories 50 and 52 to determine whether the ideal exposure value lies between the minimum and maximum exposure values of which the camera is capable. If not, the comparator produces an indication at its output 62a that the scene brightness value is beyond the camera exposure value range. This indication is transmitted by the processor 20 in the form of a predetermined binary code or signal to the recording circuits 32 which process the signal so that it is recorded by the head 30 in the magnetic layer in the film 14 as the film 14 is wound on the take-up reel 16 to the next frame.

On the other hand, if the ideal exposure value computed for the current scene does lie within the camera exposure value range (so as not to fall below the minimum camera exposure value and not exceed the maximum camera exposure value) the comparator 62 produces a signal at its other output 62b, enabling a second comparator 64 to operate. The comparator 64 operates after the operator has actually depressed the camera shutter release button. First, the processor 20 senses the actual aperture size D and the actual shutter time T which the shutter assembly 12 employed in exposing the current film frame. The ALU 20a, as indicated in FIG. 2, computes the actual exposure value from the actual aperture size D and actual shutter time T employed by the camera of FIG. 1 in exposing the current frame and stores the actual exposure value in a buffer 66. The value stored in the buffer 66 is the base two logarithm of the square of the lens focal length divided by the product of the actual shutter time and the square of the actual aperture size. The comparator 64 compares the actual exposure value stored in the buffer 66 with the ideal exposure value stored in the buffer (not shown) of arithmetic logic unit 60 to determine whether the deviation between these two values exceeds a predetermined amount. If not, then the comparator 64 concludes that the camera exposure value was acceptable. Otherwise, the comparator 64 produces a signal at its output 64a signifying that the camera exposure value was in error despite the fact that the ideal exposure value was within the exposure value range of the camera, and transmits this signal to a buffer 68. The processor 20 responds to the camera exposure value error indication stored in the buffer 68 for the current frame by transmitting a corresponding predetermined code signifying that the exposure value employed by the camera in exposing the current frame was in error. This signal is transmitted to the recording circuits 32 as the film 14 is wound on the take-up reel 16 to the next frame thereof so that the head 30 records this signal adjacent the current film frame in the magnetic layer.

Figure 3:
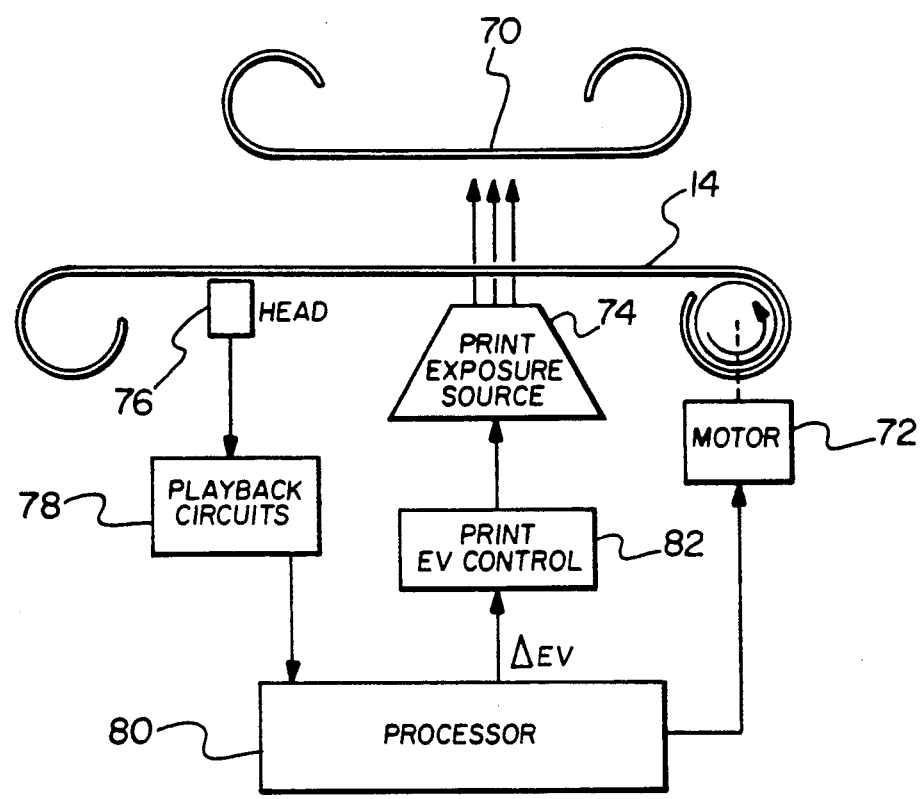
FIG. 3 is a simplified schematic block diagram illustrating photofinishing apparatus embodying another aspect of the invention.

Referring to FIG. 3, a photofinishing system embodying the invention includes the film 14 exposed by the camera of FIG. 1, a strip of photosensitive printing paper 70, a film advance motor 72, a print exposure light source 74, a magnetic playback head 76 and playback circuits 78 connected thereto. The photofinishing system of FIG. 3 also includes a processor 80. As each frame on the film strip 14 is advanced past the magnetic playback head 76 in preparation for being exposed to the print exposure source 74, the processor monitors the output of the head 76 through the playback circuit 78 to determine whether a binary code or signal signifying the scene brightness to be beyond the camera exposure value range was recorded previously in the magnetic layer in a location adjacent the current film frame. The processor 80 also determines whether the other binary code or signal indicating that the camera exposure value was in error despite the ideal exposure value being within the camera exposure value range is similarly present in the magnetic layer. If one of these indications is found by the processor 80 to be recorded adjacent the current film frame, the processor 80 so notifies the photofinishing operator. In an alternative embodiment, the processor 80 may be preprogrammed to not print any frame on the film strip 14 having an indication magnetically recorded therein that the scene brightness was beyond the exposure value range of the camera.

In one embodiment of the invention, the comparator 64 in the camera of FIGS. 1 and 2 may compute the difference Δ between the camera exposure value and the ideal exposure value and stores Δ in the buffer 68 for magnetic recording adjacent the corresponding film frame. If Δ was recorded by the camera, then the photofinishing processor 80 displays the magnitude and direction of the deviation between the actual exposure value and the ideal exposure value to the photofinishing operator just as the current frame on the film 14 is transported past the head 76 in preparation for being exposed by the print exposure source 74. Using this information, the photofinishing operator may adjust the amount of light or exposure value with which the print exposure source 74 exposes the print paper 70 to the current frame on the film 14. Such an adjustment can compensate for the error in the camera exposure value.

Figure 4:
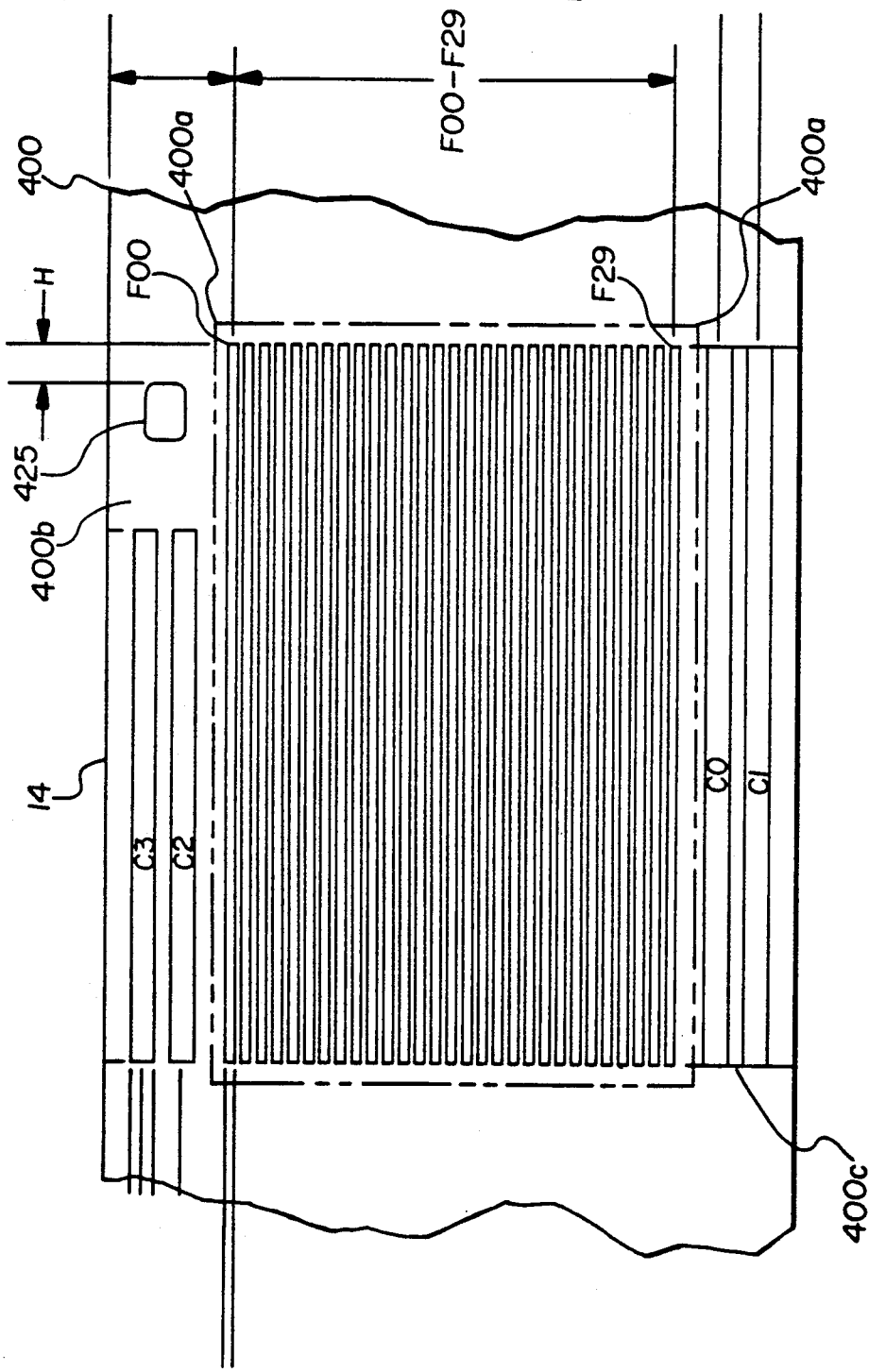
FIG. 4 is a plan view of the parallel magnetic tracks in film used in the camera of FIG. 1 and the photofinishing apparatus of FIG. 3.
Figure 5:
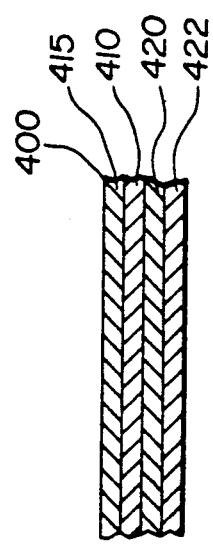
FIG. 5 is a cross-sectional view of the film of FIG. 4.

Referring to FIG. 4, the magnetic head 30 in the camera of FIG. 1 records the predetermined binary sequence of signals indicating a beyond camera exposure value range condition or another predetermined binary sequence or signal representing a camera exposure value error condition in a predetermined one of plural magnetic tracks C0–C3 or F00–F29 extending parallel with the length of the film 14. In the preferred embodiment, the tracks C0–C3 would be employed for such recording, because these tracks lie outside of the image frame area 400a on the film 14. The advantage of such a choice is that the magnetic head 30 may be narrow enough so as to contact only the peripheral film regions 400b, 400c, and thereby avoid possibly scratching the image frame area 400a. In one aspect of the invention, different ones of the plural tracks in FIG. 4 are dedicated to recording different types of information. Thus, the indication of a beyond camera exposure value range is always recorded in a particular one of the tracks C0–C3, so that the photofinisher may readily determine whether the current film frame was subject to that condition by searching that particular dedicated track. In another aspect of the invention, each of the tracks illustrated in FIG. 4 starts and stops within the length of the image frame 400a. In this way, the information magnetically recorded in connection with that frame is unambiguously associated with that frame by its location in the magnetic tracks adjacent that frame. In this aspect, the film 14, in addition to storing the photographic image, also functions in the manner of an X-Y addressable random access memory in which each frame is addressed by moving the film along the X direction, while the particular information type to be monitored is addressed by searching for one of the parallel tracks in the Y direction. In one embodiment of the invention, the photofinisher system of FIG. 3 simply monitors for a beyond camera exposure value range indicator by simply determining whether a particular one of the magnetic tracks C0–C3 is empty or whether it contains the signal indicating the beyond camera EV range condition. Thus, the photofinisher system need do very little searching to monitor all frames on the film 14 without interrupting the printing process to any significant degree. As shown in FIG. 5, film 400 typically includes a base 410, various well known photochemical layers 415 on one side of the base and a virtually transparent magnetic layer 420 on the other side. An antistatic and lubrication layer 422 can overlie the magnetic layer 420.

While the invention has been described in detail with reference to a preferred embodiment thereof, it is understood that variations and modifications thereof may be made without departing from the true spirit and scope of the invention.

What is claimed is:

1. A camera having a shutter assembly, means for sensing scene brightness, means for sensing film speed, and means for controlling shutter exposure time and shutter aperture size of the shutter assembly, said camera being suitable for photographically exposing successive frames of a film strip having a virtually transparent magnetic layer, and further comprising:
    magnetic head means for recording in said magnetic layer of said film strip; and
    a processor including means for:
        a. computing an ideal exposure value from a film speed value and a scene brightness value furnished by said means for sensing said film speed and said means for sensing said scene brightness, respectively,
        b. sensing maximum and minimum aperture sizes and shutter speed of which said shutter assembly is capable and computing therefrom an exposure value range of said camera, and
        c. determining whether said ideal exposure value lies within said camera exposure value range and, if not, transmitting a beyond camera exposure value range indication to said magnetic head means for recording in said magnetic layer of said film strip in a location on said film strip adjacent or within a corresponding film frame.

2. The camera of claim 1 wherein said processor further comprises means for:
    a. sensing an aperture size and shutter time actually employed by said shutter assembly in exposing a current frame on said film strip,
    b. computing from said actual aperture size and shutter time an actual exposure value associated with said frame, and
    c. determining the difference between said actual and ideal exposure values and transmitting said difference to said magnetic head means for recording of said difference in said magnetic layer of said film strip in a location on said film strip within or adjacent said corresponding film frame.

3. The camera of claim 1 wherein said processor transmits said indication to said magnetic head means while said film strip is being transported to juxtapose the next frame thereof adjacent said shutter assembly for a subsequent exposure, and wherein said magnetic head is held in a stationary position and said indication is recorded in the magnetic layer of said film strip in a magnetic track extending parallel with a lengthwise direction of said film strip, the magnetic track having a length which is spanned by a length of the corresponding film frame.

4. The camera of claim 2 wherein said beyond camera exposure value range indication and said exposure value difference are each recorded in a respective parallel dedicated magnetic track in the magnetic layer of said film strip by said magnetic head means.

5. A photofinishing apparatus including a print exposure light source for making prints on photosensitive paper form previously developed photographic images in frames of a film strip having a virtually transparent magnetic layer therein, and further comprising:
    magnetic head means for sensing data previously recorded in the magnetic layer of said film strip; and
    a processor including means for:
        a. controlling positioning of said film strip so that a particular frame thereof is adjacent said magnetic head means in preparation for exposure by said print exposure light source,
        b. sensing data read by said magnetic head means from a location in said film strip adjacent or within said particular frame,
        c. determining whether said data includes a predetermined beyond camera exposure value range indication, and
        d. flagging the particular frame if the beyond camera exposure value range indication is found in said data.

6. The photofinishing apparatus of claim 5 wherein said processor further comprises means for preventing the exposure of a photographic image in a frame of said film strip whenever a beyond camera exposure value range indication is found in data sensed in a magnetic track adjacent said frame.

7. The photofinishing apparatus of claim 5 further comprising operator display means and wherein said processor further comprises means for:
    a. determining whether data sensed by said magnetic head means represents a difference between an actual exposure value and an ideal exposure value, and
    b. if so, transmitting said difference as a value to said operator display means.

* * * * *